(No Model.)
E. WESTON.
APPARATUS FOR CHARGING AND DISCHARGING SECONDARY BATTERIES.
No. 285,714. Patented Sept. 25, 1883.
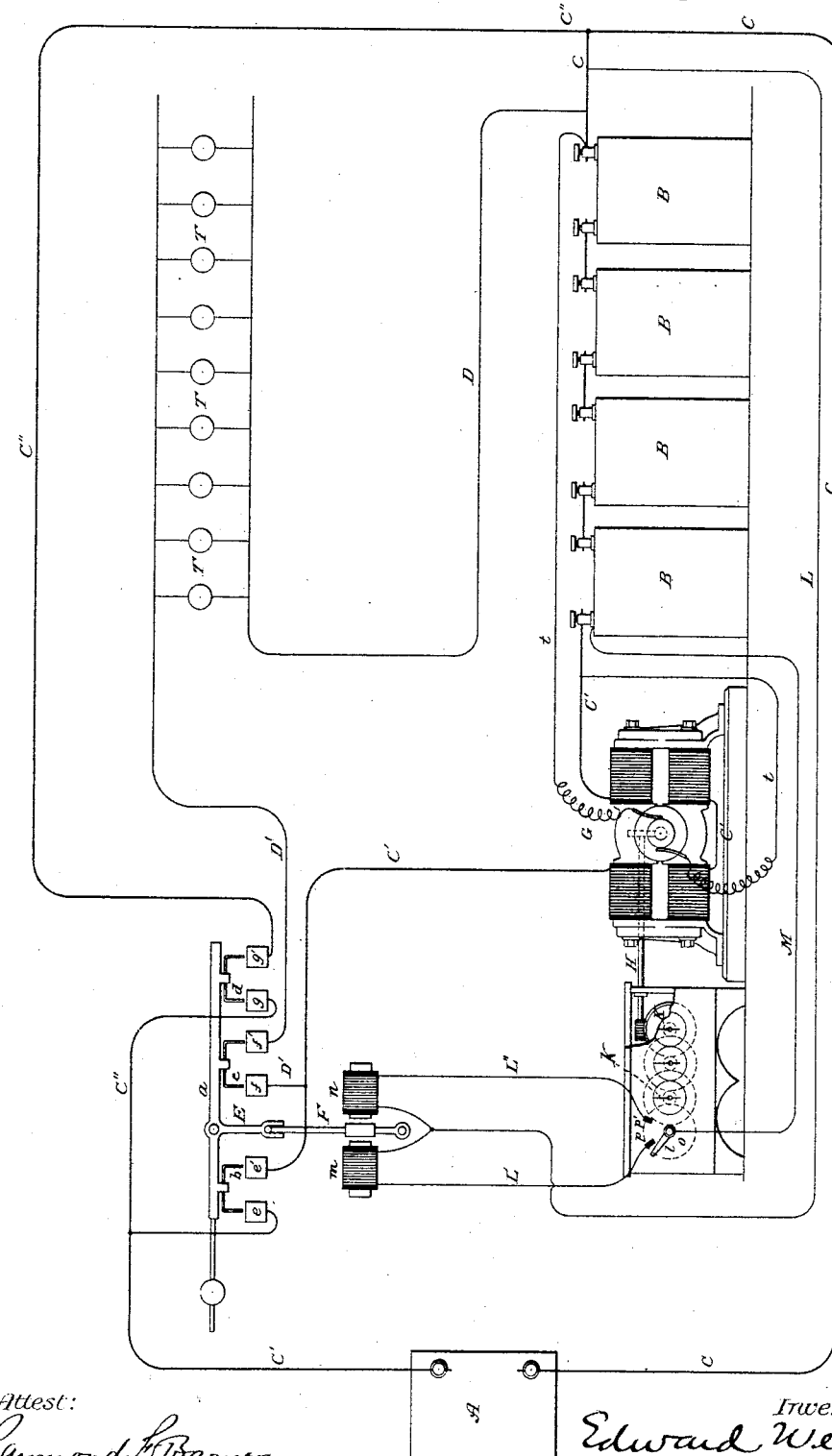

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

APPARATUS FOR CHARGING AND DISCHARGING SECONDARY BATTERIES.

SPECIFICATION forming part of Letters Patent No. 285,714, dated September 25, 1883.

Application filed April 6, 1883. (No model.)

*To all whom it may concern:*

Be it known that I, EDWARD WESTON, a subject of the Queen of Great Britain, and resident of Newark, in the county of Essex and State of New Jersey, have invented certain new and useful Improvements in Apparatus for Charging and Discharging Secondary Batteries, of which the following is a specification, reference being had to the drawing accompanying and forming a part of the same.

My invention relates to systems of electrical generation and distribution in which one or more secondary batteries are employed in conjunction with the generator or generators and the lamps or other devices for utilizing or converting the current.

The general arrangement of the system especially contemplated by my invention is as follows: A generator—such as one or a group of dynamo-machines—is located at a station or at some convenient source of power, and line-wires connect this generator with one or any number of secondary batteries, which are located in the buildings, shops, or other places where the current is to be applied. Local circuits are run from the secondary batteries, and with these electrical devices, of whatever character they may be, are connected.

The main advantages of this system—elsewhere pointed out by me, and now generally understood—are that the generators may be run only during such time as is necessary to charge the batteries, while a saving in the size of the line-wires is effected and currents of high tension utilized by the proper arrangement of the batteries and local circuits for running incandescent lamps, or for purposes in general that ordinarily require currents of great quantity. For the practical and economical working of such a system, however, it is necessary to disconnect from the main or charging circuit the batteries as soon as they have received their full charge; and to effect this automatically and through the instrumentality of devices of a more simple and reliable character than have hitherto been employed is the special object of my invention.

To this end I employ, in combination with the parts of a system above named—that is to say, the generators, the charging-wire, the batteries, and the local circuits—electromotors or equivalent devices, which, after having been caused to perform a definite amount of work by the charging-current, disconnect the batteries from the charging-circuit, or which, after having been caused by the battery-current to perform an equivalent amount of work, bring the batteries back into the charging-circuit. From the nature of the case it is evident that such a means of connecting or disconnecting the batteries is applicable to any system in which one or more secondary batteries may be charged from a given generator; and, further, that the specific character of the controlling mechanism may be greatly varied without affecting the general result. In describing my invention, therefore, I shall refer to the accompanying drawing, which represents, in diagram, a generator, a single battery only, and controlling mechanism of a special kind, which, however, in principle of operation is typical of the devices included in my invention.

Let A designate an electrical generator; B B, a secondary battery—that is to say, a group of secondary battery-cells; C C′, the line-wires of a circuit from the generator to the battery, and D D′ the wires of a circuit from or for the battery, and including the lamps T or devices to which the current is to be applied.

Near the battery is a lever, $a$, pivoted at its center, and carrying three U-shaped arms, $b$ $c$ $d$, of metal, though insulated from the lever in the event of the latter being composed of conducting material. Under the ends of arms $b$ $c$ $d$ are mercury contact-cups $e$ $e'$ $f$ $f'$ $g$ $g'$. A forked arm, E, extends down from the center of lever $a$, and a pivoted armature-lever, F, engages with it in the manner shown. Two electro-magnets, $m$ $n$, are set on opposite sides of the lever F and adjusted in such manner that when magnet $m$ is active the lever $a$ will be tilted by the lever F into a position where the arm $b$ will be raised out of the mercury-cups $e$ $e'$, and arms $c$ $d$ will dip into the cups $f$ $f'$ $g$ $g'$, and that when, on the other hand, magnet $n$ is active arm $b$ will dip into the cup below it and arms $c$ $d$ be raised.

G is an electro-magnetic motor, the field-magnets of which are wound with one of the conductors C C', while the armature is included in a circuit, t t, of high resistance around all or a part of the cells of the battery B B.

H is a spindle which transmits the motion of the armature-shaft of the motor G to a train of wheels, K. The last member of this train meshes with a pinion-shaft carrying a contact-arm, l, that moves over a disk, o, upon which are two insulated contact-stops, p p'. The rotation of the motor moves the arm l slowly around until it comes into contact with one of these stops, the direction of movement of the arm l depending, of course, upon the direction of rotation of the motor.

L, a wire from one pole of the battery B, is carried to the magnets m n, it being branched and wound around both magnets, the branches L' L'' being then connected, respectively, to the stops p p'. A wire, M, connects the arm l with the opposite pole of battery B. The resistance of this circuit is comparatively high, so that but little current flows through it when closed.

The remaining circuit-connections are as follows: The wire C leads from one pole of the generator A to one of the terminals of the battery B. Wire C' leads from the opposite pole of the generator to the mercury-cup e. A continuation of the wire C' leads from mercury-cup e' to the motor, passes around the field-magnets of the same, and then connects with the battery B. Wire D runs from one pole of the battery to the lamps. Wire D' is taken from wire C' between the cup e' and the battery, and connects with cup f. A continuation of this wire leads from cup f' to the lamps. A conductor, C'', for carrying the current around the battery when the latter is disconnected from the charging-circuit, extends from wire C' to cup g and from cup g' to wire C.

The operation of the system is as follows: Assuming that the lever a is tilted into a position in which arm b dips into the cup beneath it, the current from the generator will pass through battery B, charging it. At the same time the motor is revolved, the rapidity of revolution being determined by the strength of the current passing through its field-coils, and, this motion being imparted to the train of wheels K, the arm l is slowly moved around toward the stop p. When the motor has made a certain number of revolutions, the arm l is brought into contact with stop p, magnet m is energized, and the lever a shifted, so that the arm b is lifted out of the cups e e', the battery disconnected from the charging-circuit connected with the local circuit, which is now formed by the wires D D', and that portion of wire C' included between the battery and the point at which wire D' is joined to it, and a path provided for the generator-current through the wire C''. When this takes place, the current flows through the field of the motor G in an opposite direction. The direction of rotation, therefore, is reversed, so that arm l is in time brought back toward the stop p'. It will reach stop p' and connect again the battery with the charging-circuit when the motor has completed an amount of work equal to that which it was caused to perform by the current charging the battery. In this way the current expended by the battery will be equal to that which it has received.

With batteries in which a fall or leakage of the current occurs, provision may be made in many well-understood ways for imparting to the arm l a quicker movement for a given number of revolutions of the motor in one direction than in the other, so that when the battery is discharging a smaller amount of current may be utilized for connecting the battery with the charging-circuit than was required for disconnecting it.

It is to be observed that the amount of current passed into the battery or the number of turns of the motor-shaft is in some respects arbitrary, as by reducing the motion of the motor-shaft more or less a greater or lesser amount of charge may be imparted to the battery. For convenience, the train of wheels K is supplied with pointers k, which by their position indicate at a glance the amount of charge which the battery at any time contains.

If so desired, the motor and its appurtenances may be employed only for disconnecting the battery from the charging-circuit, or only for connecting it when its charge is expended, other means, either manual or automatic, being employed in the one case for connecting, in the other for disconnecting, the battery when required.

As before stated, the means for carrying out my invention, which I have now described, may be greatly varied without departure from the invention. The motor, for example, or any device by means of which the desired results may be attained by a movement caused by the passage through it of a definite amount of current, may be employed for imparting motion to any other suitable mechanism for effecting the same object, either in the specific way described or in others—as by shifting the lever a, or any equivalent therefor, directly and without the intermediate system of magnets; and it is also evident that without alterations the devices described, or their equivalents, may be employed where more than one battery is charged from the same circuit.

The broad idea of connecting with the circuit, or disconnecting from the same, a secondary battery by means of an electromotor or any device capable of operating or being called into operation when a given amount of current shall have acted upon it, I do not claim herein, the present application being confined, first, to such devices only when combined in the manner described with the secondary battery—that is to say, when they are included in the main or charging circuit and acted upon by the entire current flowing therein; and, second, to an electro-magnetic motor when arranged for operation substantially as herein set forth or in any equivalent manner. Features of novelty, however, not herein claimed but shown or described will be made subject of other applications.

What I now claim is—

1. The combination, with a generator, a secondary battery, and a charging-circuit, of switch mechanism and an electro-magnetic motor connected with the charging-circuit, and adapted to operate said switch mechanism when a given amount of current shall have acted upon it, these parts being combined for operation in substantially the manner set forth.

2. The combination, with a generator, a secondary battery, and a charging-circuit, of a switch mechanism for connecting the battery with the charging-circuit, or disconnecting it therefrom, an electro-magnetic motor connected with the charging-circuit, and intermediate devices for imparting the motion of the motor to the switch mechanism when a given amount of current shall have actuated the motor, as and for the purpose set forth.

3. The combination, with a generator, a secondary battery, a charging-circuit, and a local circuit, of switch mechanism for shifting the battery from the charging-circuit to the local circuit and conversely, an electro-magnetic motor arranged to be actuated by both the charging and local circuits, but in opposite directions, and intermediate mechanism for imparting the motion of the motor to the switch mechanism when a given amount of current shall have actuated the motor, as and for the purpose set forth.

4. The combination, with a generator, a secondary battery, and a charging-circuit, of a switch mechanism for connecting the battery with the charging-circuit and disconnecting it therefrom, an electro-magnetic motor actuated by the charging-circuit, a device for operating the switch mechanism, and a train of wheels in gear with the motor and connected with the switch-operating device, as and for the purpose specified.

5. The combination, with a generator, a secondary battery, and a charging-circuit, of a switch mechanism for connecting the battery with the charging-circuit or disconnecting it therefrom, electro-magnets for operating the switch, an electromotor actuated by the charging-circuit, a contact-arm or circuit-closer for completing the circuit through the magnets, and a train of wheels driven by the motor and connected with the circuit-closer, substantially as and for the purpose specified.

6. The combination, with a generator, a secondary battery, and a charging-circuit, of a switch mechanism for connecting the battery with the charging-circuit and disconnecting it therefrom, an electromotor actuated by the charging-circuit, a device for operating the switch mechanism, and a train of wheels in gear with the motor and connected with the switch-operating device, the said train being arranged as an indicator, as and for the purpose set forth.

In testimony whereof I have hereunto set my hand this 2d day of April, 1883.

EDWARD WESTON.

Witnesses:
LEONARD E. CURTIS,
W. H. HARTLEY.